United States Patent

Miyamori et al.

[11] Patent Number: 5,705,907
[45] Date of Patent: Jan. 6, 1998

[54] DRIVE CONTROL SYSTEM FOR SERVO MOTOR

[75] Inventors: Hiroyuki Miyamori; Norihiro Oba, both of Miyagi-ken, Japan

[73] Assignee: Alps Electric Co., Ltd., Tokyo, Japan

[21] Appl. No.: 578,119

[22] Filed: Dec. 27, 1995

[30] Foreign Application Priority Data

Dec. 27, 1994  [JP]  Japan .................. 6-325705

[51] Int. Cl.$^6$ .......................................... H02P 5/00
[52] U.S. Cl. .......................................... 318/599; 318/603
[58] Field of Search .......................... 318/560–632; 388/811, 829, 912

[56] References Cited

U.S. PATENT DOCUMENTS

| | | |
|---|---|---|
| 4,270,868 | 6/1981 | Morgan et al. .................. 318/599 |
| 4,482,850 | 11/1984 | Sonoda et al. .................. 318/606 |
| 4,486,692 | 12/1984 | Sonoda et al. .................. 318/258 |
| 4,794,312 | 12/1988 | Kano et al. . |
| 5,289,097 | 2/1994 | Erickson et al. .................. 318/561 |
| 5,572,105 | 11/1996 | Nojima et al. .................. 318/696 |
| 5,578,911 | 11/1996 | Carter et al. .................. 318/376 |

*Primary Examiner*—Paul Ip
*Attorney, Agent, or Firm*—Guy W. Shoup; Patrick T. Bever

[57] ABSTRACT

A drive control system for supplying a drive voltage to a DC servo motor. The drive control system includes a position detector for detecting a rotational position of the DC servo motor, and a controller which switches the drive mode of the DC servo motor from DC drive to PWM drive when a detected position value obtained by the position detector is within a predetermined amount of a value corresponding to a target stop position.

2 Claims, 6 Drawing Sheets

DRIVE CONTROL SYSTEM FOR SERVO MOTOR

BACKGROUND OF THE INVENTION

1. Field of the Invention

The present invention relates to a drive control system for a servo motor and more particularly to a servo motor drive control system for improving the stop position accuracy of an actuator which is driven by a DC servo motor.

2. Description of the Related Art

A servo motor is used, for example, in an automobile for electrically controlling a wind direction flap in an air outlet of an air conditioner, or for controlling a refresh (REF)/recycle change-over lever.

FIG. 7 is a block diagram showing a conventional servo motor drive control system. The conventional servo motor drive control system includes a DC servo motor 10, which serves as a drive source for a motor actuator (M/A), which is connected to a drive circuit 11 which, in turn, is connected to a central processing unit (CPU) 12.

During operation, the CPU 12 controls rotation of the DC servo motor 12 by transmitting commands to the drive circuit 11 which are based on a detected position of, for example, the wind direction flap or the refresh (REF)/recycle change-over lever. When the CPU 12 transmits a start command, the drive circuit 11 applies a high (H) level DC output signal across the DC servo motor 10, thereby causing the DC servo motor 10 to rotate. Conversely, when the CPU 12 transmits a stop command, the drive circuit 11 turns off the DC output signal (i.e., applies a low (L) level DC output signal across the DC servo motor 12), thereby causing the DC servo motor 10 to stop rotating. Thus, by on/off controlling the high level DC output signal, the CPU 12 the drive circuit 11 control the start and stop of rotation of the DC servo motor 10, thereby controlling the position (angle) of, for example, the wind direction flap or the refresh (REF)/recycle change-over lever. This position is detected in the form of an electric signal by a detector and the detected position signal is transmitted to the CPU 12. On the basis of this detected position signal, the CPU 12 transmits the start and stop commands to the drive circuit 11. When a target stop position of the motor actuator (M/A) and the detected position signal coincide with each other, the CPU 12 issues a stop command for stopping rotation of the DC servo motor 10.

One problem associated with the conventional servo motor drive control system is that it is difficult to accurately stop a DC servo motor at a desired (target) position. That is, the power supply to the DC servo motor 10 is cut off when the rotor of the servo motor reaches the target position. However, due to inertial force, the rotor continues to rotate after the power is cut off, thereby causing the rotor to overshoot the target position.

The above-mentioned problem is explained in greater detail with reference to FIG. 8. FIG. 8 shows, for example, positioning of the wind direction flap in an air outlet. As shown in FIG. 8, when the M/A is rotated to move the rotor from position ① toward the target position, the CPU 12 issues a stop command when the rotor reaches the target position while the rotor is in motion. However, inertial force of the M/A causes the rotor to overshoot the target position and to stop at the position ②. Using the detected position value associated with position ②, the CPU 12 then issues a start command causing the DC servo motor 10 to rotate in a reverse (counter-clockwise) direction toward the target position. Again, however, because the CPU 12 issues a stop command when the rotor is at the target position while the rotor is moving, the rotor overshoots the target position and stops at position ③. Because the rotor position signal does not coincide with the target position, the DC servo motor 10 is rotated forward (clockwise) toward the target position. Again, however, inertial force causes the rotor to overshoot the target position and stop at the position ④. Now, if the DC servo motor 10 is again rotated in the reverse direction, the rotor will overshoot the target position and stop at the position ⑤. Thus, a hunting phenomenon occurs during which it is impossible to cause the rotor to stop at the target position.

One known method of preventing the hunting phenomenon is to provide a hysteresis (tolerance) for the target position such that the CPU 12 will issue a stop command when the rotor is within a predetermined distance of the target position. However, in order to enhance the stop position accuracy of the rotor it is necessary to narrow the hysteresis width and, hence, necessary to change the CPU and M/A. With the conventional construction, therefore, it is very difficult to improve stop position accuracy without significantly changing the design of the servo motor drive control system.

SUMMARY OF THE INVENTION

It is the first object of the present invention to provide a drive control system for a servo motor capable of narrowing the hysteresis width and thereby improving the stop position accuracy of a motor actuator.

It is the second object of the present invention to provide a drive control system for a servo motor capable of decreasing the rotating speed of the motor as the motor actuator approaches a target position, thereby allowing the actuator to stop at the target position with high accuracy.

It is the third object of the present invention to provide a drive control system for a servo motor wherein the number of revolutions of the motor is varied in a pseudo-analog manner to effect highly accurate stop control.

It is the fourth object of the present invention to provide a drive control system for a servo motor having a simple structure, small size and low cost.

It is the fifth object of the present invention to provide a drive control system for a servo motor wherein, even at a small duty ratio, a desired motor torque may be maintained, thereby preventing the motor from becoming inoperative even with variation in the motor supply voltage fed from a car battery.

According to a first aspect of the present invention, a servo motor drive control system is provided for supplying a DC voltage to a servo motor to drive the servo motor, the servo motor drive control system including a position detector for detecting a rotational position of the servo motor and a control means which switches over from DC drive to pulse width modulation (PWM) drive when a position value detected by the position detector is within a predetermined amount of a value corresponding to a target stop position. By this construction it is possible to narrow the hysteresis width and improve the accuracy of the motor actuator stop position.

According to a second aspect of the present invention, there is provided a means for incrementing duty ratio values during the PWM drive period from larger to smaller values. Consequently, the rotating speed of the motor can be made lower as the motor actuator approaches the target position, whereby stopping at the target position can be accomplished with a high degree of accuracy.

According to a third aspect of the present invention, there is provided a means incrementing duty ratio values during the PWM drive period in a continuous manner in steps from larger to smaller values, thereby causing the revolving speed of the motor to change in a pseudo-analog manner, whereby the stop control at the target position can be attained with the highest accuracy.

According to a fourth aspect of the present invention, there is provided a means in which since a potentiometer is used as the position detecting means, it is possible to simplify the structure and reduce the size and cost of the drive control system.

According to a fifth aspect of the present invention, there is provided a means in which for example even in the case where the duty ratio in PWM drive is fixed at 10% (a small duty ratio results in improved control accuracy but makes it impossible to obtain a required motor torque), there is neither a fear of a desired motor torque being no longer obtained due to a change in the motor supply voltage fed from the battery of a car nor a fear of the motor becoming inoperative.

DESCRIPTION OF THE PREFERRED EMBODIMENTS

Embodiments of the present invention will be described hereinunder with reference to the accompanying drawings.

Figure 1:
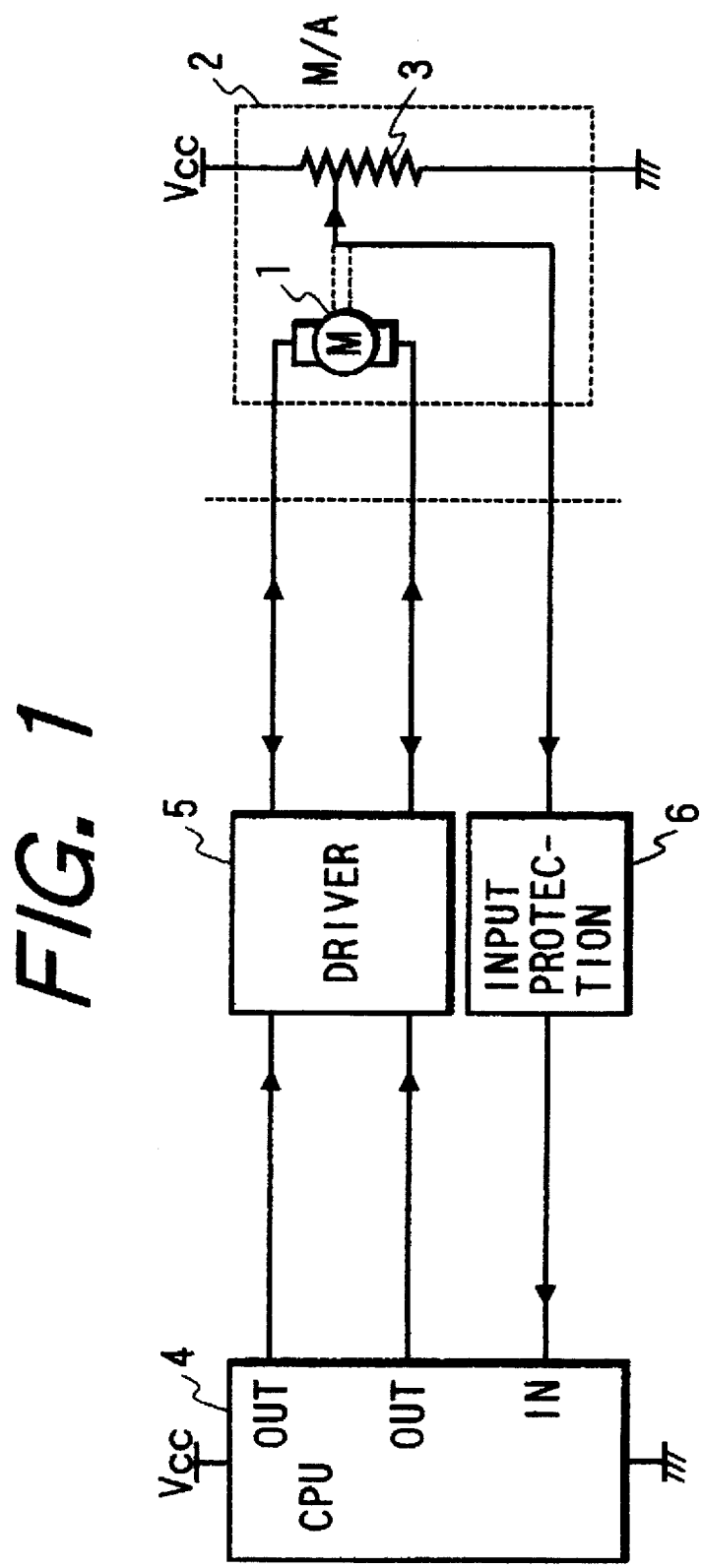
FIG. 1 is a circuit diagram showing a drive control system for a servo motor according to a first embodiment of the present invention.

FIG. 1 is a circuit diagram illustrating a drive control system for a servo motor according to a first embodiment of the present invention.

The drive control system includes a DC servo motor 1 serves as a drive source for a motor actuator (M/A) 2, wherein rotation of the DC servo motor 1 adjusts the position of, for example, the wind direction flap in an air outlet of a car air conditioner or a refresh (REF)/recycle change-over lever. The M/A 2 includes a potentiometer (variable resistor) 3 (position detecting means), whose resistance value varies in accordance with the rotational position of the DC servo motor 1.

The drive control system also includes a CPU 4 (control means) for generating control signals which are transmitted to a driver 5. The driver 5 applies a driving current through the DC servo motor 1 in response to the control signals provided by CPU 4.

Further provided is an input protection circuit 6 which detects a voltage obtained from a variable terminal of the potentiometer 3, converts the voltage into a position signal indicative of the current position of the potentiometer wiper, and transmits the position signal to the CPU 4.

The CPU 4 may be implemented using a one-chip microcomputer, to which are attached a ROM storing programs and a RAM for temporary storage of data, etc. In the present invention, as will be described later, the voltage applied to the DC servo motor 1 is switched from DC voltage to PWM (pulse width modulation) voltage as the M/A 2 approaches a target position. A control program for such voltage change may be stored in the above-mentioned ROM.

The driver 5 is a circuit for supplying a predetermined electric power to the DC servo motor 1 in accordance with the command signals generated by the CPU 4 which is constituted using power transistors. For example, the driver 5 includes an H bridge circuit composed of four power transistors at the portion to which the DC servo motor is connected directly.

Figure 2:
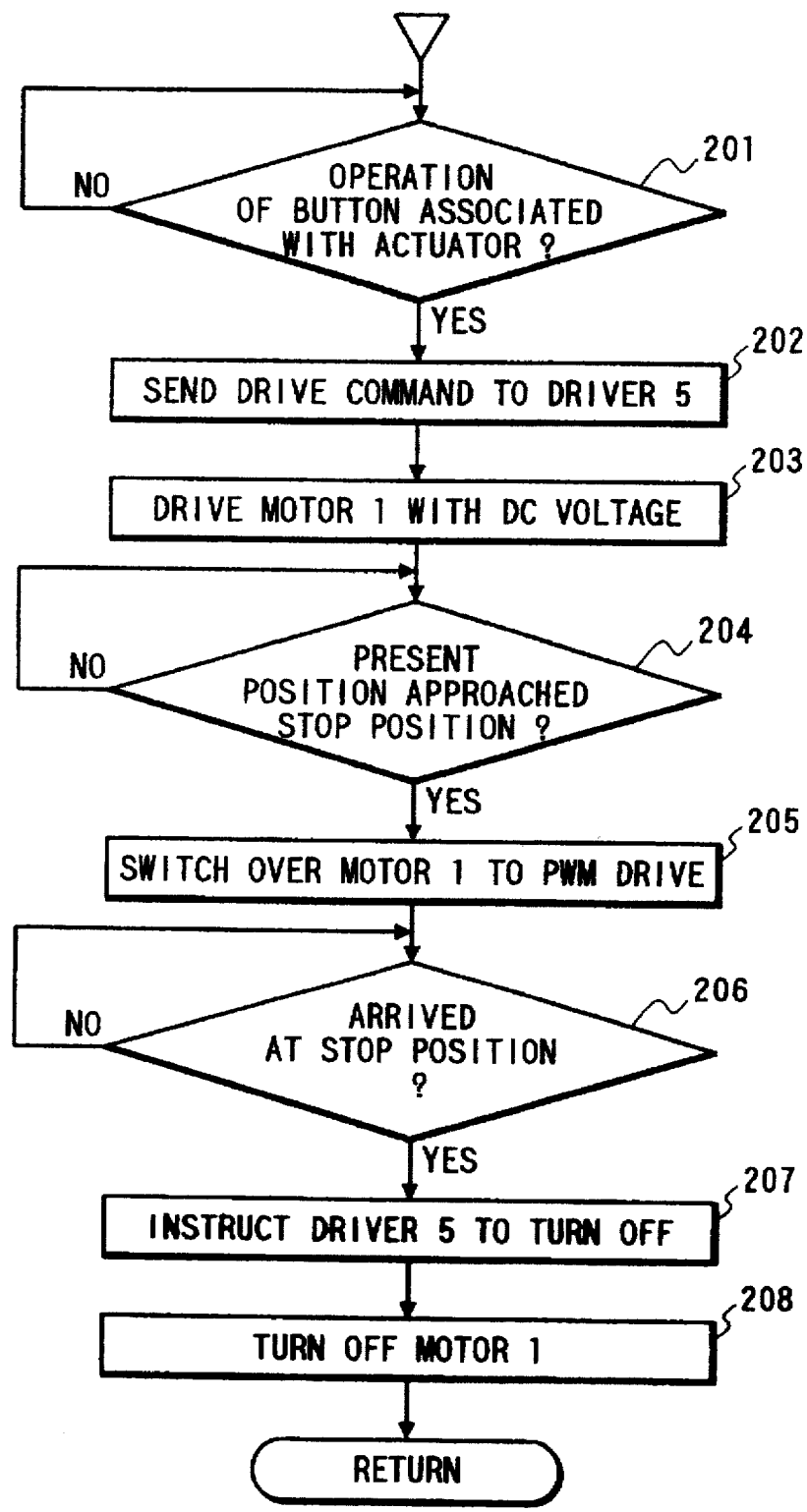
FIG. 2 is a flowchart showing the operation of the first embodiment.

Operation of the first embodiment will be described below with reference to the flowchart of FIG. 2 and the drive voltage waveform diagram of FIG. 3.

When an operation button provided in the front face of an actuator portion of the car air conditioner is operated (step 201) such that a newly-established target position differs from a current position signal generated by the input protection circuit 6, the CPU 4 issues a DC drive command to the driver 5 (step 202). In response to the start command, the driver 5 applies a DC voltage across the DC servo motor 1 (step 203). As shown in FIG. 1, a DC voltage, Vcc, is applied to the potentiometer 3, and the output voltage at its variable terminal varies with the rotation of the DC servo motor 1. This output voltage is converted to the current position signal by the input protection circuit 6, and is transmitted to the CPU 4, thereby notifying the CPU 4 of a change in the current position of the potentiometer.

Figure 3:
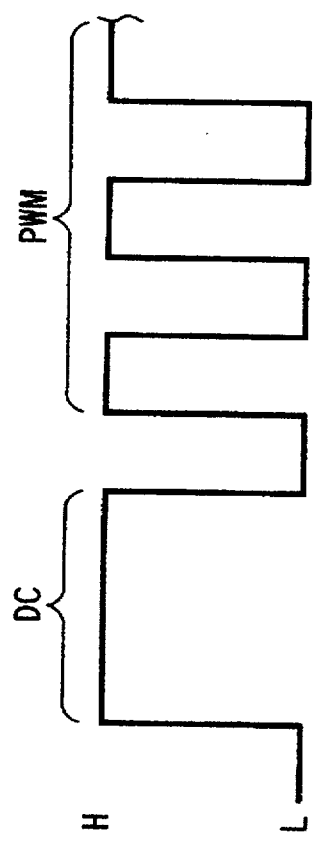
FIG. 3 is a drive voltage waveform diagram of a DC servo motor in the first embodiment.

When the CPU 4 determines that the current position signal has a value which is within a predetermined amount of a target position value (step 204), the CPU 4 issues a PWM drive command to the driver 5, thereby causing the drive voltage applied across the DC servo motor to switch-over from DC voltage to PWM voltage (step 205), as indicated in FIG. 3. In response to the PWM drive signal, the DC servo motor 1 slows down to a rotating speed proportional to the duty ratio of the PWM drive signal.

For example, if the duty ratio is set at 50%, the motor rotating speed becomes one-half of the DC drive speed, and hence it is possible to reduce the hysteresis width by one-half. When the CPU 4 determines through monitoring of the current position signal that the motor actuator has reached the stop position (step 206), the CPU 4 issues a power OFF command to the driver 5 (step 207), which in turn stops the supply of electric power to the DC servo motor 1 (step 208).

According to the first embodiment constructed as above, by making a control of switch-over from DC drive to PWM drive to decrease the rotating speed of the DC servo motor 1, it is possible to narrow the hysteresis width and thereby improve the stop position accuracy of the M/A.

A description is now provided regarding a modification of the first embodiment.

Although the PWM duty ratio is described in the first embodiment as being 50%, the servo motor control system may be modified such that a plurality of duty ratios are sequentially applied to the servo motor 1 during the PWM drive period (that is, as the current position approaches the target position). For example, at the end of the 100% duty ratio (DC drive) period, the duty ratio applied to the servo motor 1 may be reduced in a stepwise manner from 75% →50% →25% during the PWM drive period.

By controlling the duty ratio during PWM drive it is possible to effect smooth control of the stopping process and further enhance the stop position accuracy.

In accordance with another modification, although in the above modification the PWM duty ratio was set reduced step by step in increments of 25%, it may be reduced using smaller increments. For example, when the duty ratio is incrementally reduced from 100% to 25% if the incremental change is in steps of 2%, such as 75% →. . . →60% →58% →56% . . . →54% →. . . →25%, it becomes possible to closely control the operation of the motor in a manner similar to applying an analog signal.

As a result, it is possible to effect a more smooth control than in the previous modification.

Reference will now be made to a second embodiment of the present invention.

Figure 4:
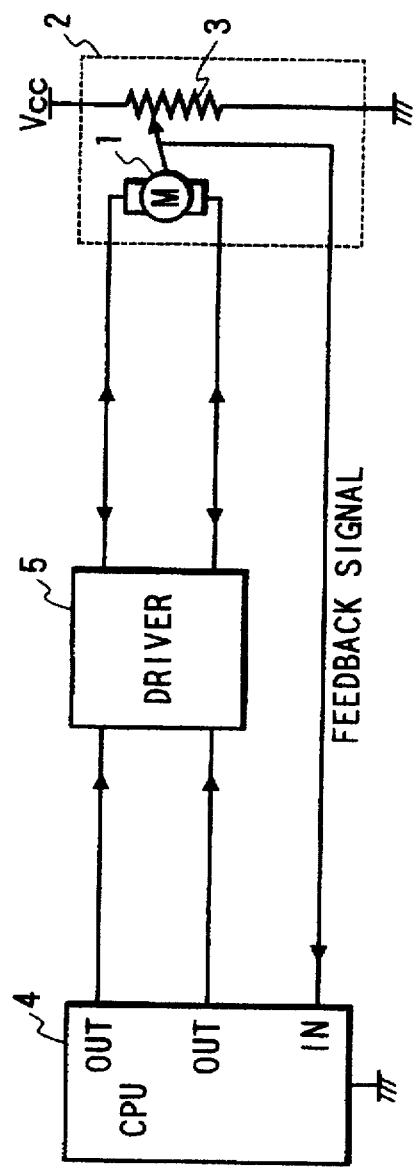
FIG. 4 is a circuit diagram showing a drive control system for a servo motor according to a second embodiment of the present invention.
Figure 5:
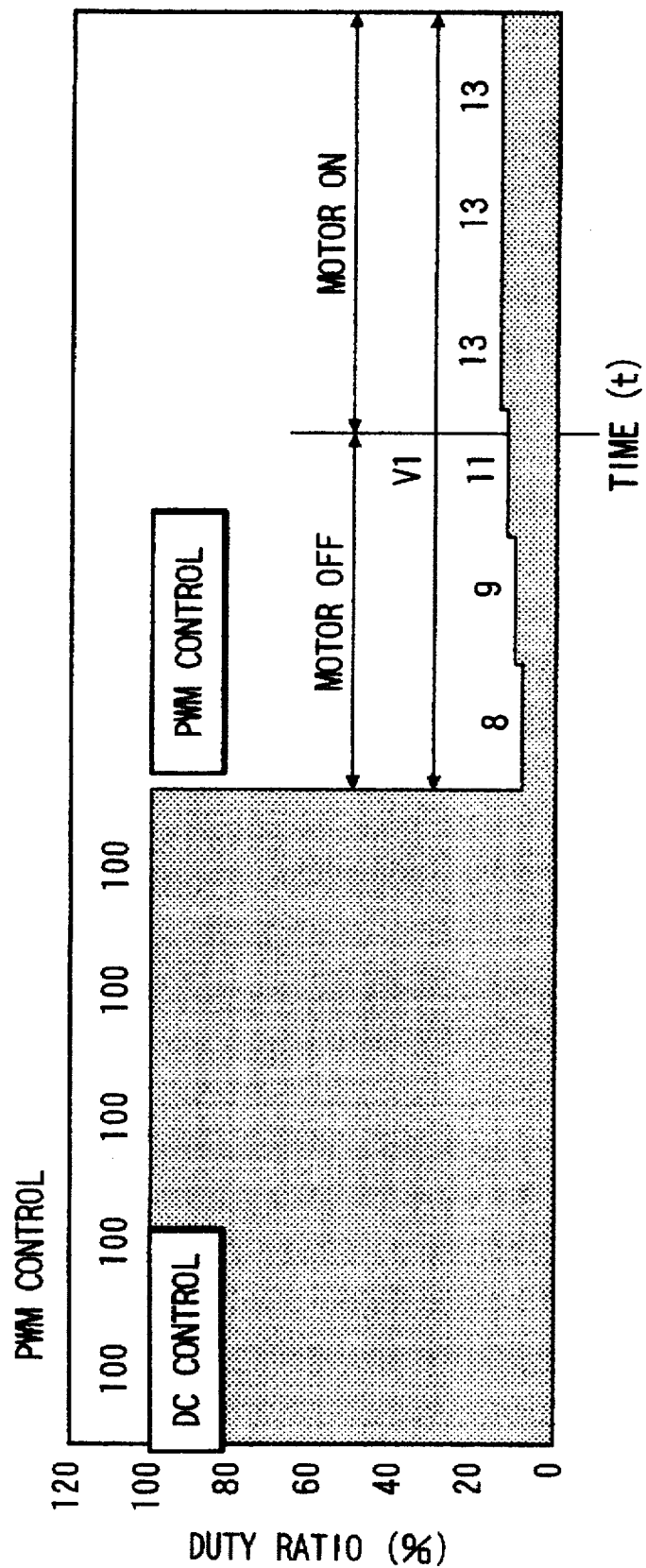
FIG. 5 is an explanatory view showing PWM control in the second embodiment.
Figure 6:
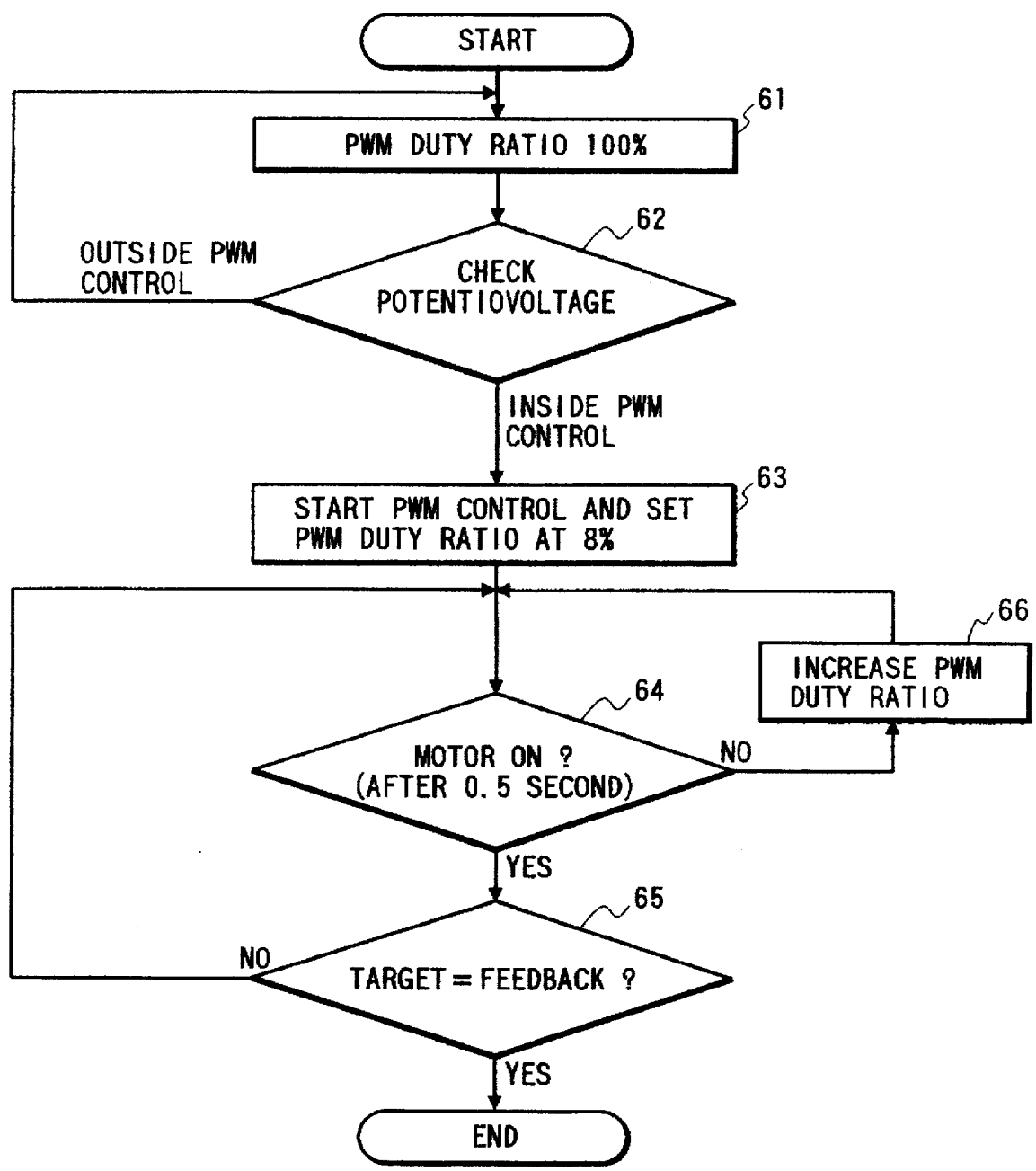
FIG. 6 is a flowchart showing the operation of the second embodiment.
Figure 7:
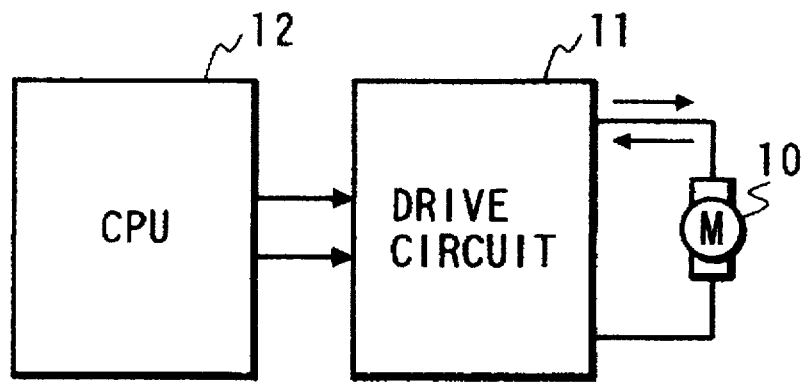
FIG. 7 is a block diagram showing a conventional drive control system for a servo motor.
Figure 8:
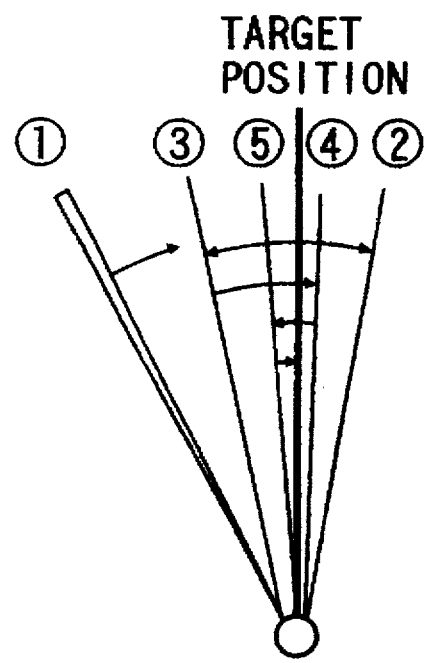
FIG. 8 is an explanatory view showing in what manner a hunting phenomenon of an actuator occurs in the conventional servo motor drive control system.

FIG. 4 is a circuit diagram illustrating a drive control system according to a second embodiment of the present invention, FIG. 5 is an explanatory view illustrating a PWM control in the second embodiment, and FIG. 6 is a flowchart illustrating the operation of the second embodiment shown in FIG. 4.

According to the second embodiment, as in the first embodiment, as, for example, the wind direction flap in an air outlet of a car air conditioner approaches a target position, a control signal generated by the CPU 4 causes the driver 5 to change from DC drive to PWM drive. However, the second embodiment differs from the first embodiment in that the duty ratio in PWM drive is varied in accordance with the operating state (in motion or stopped) of the motor 1.

A circuit diagram of the second embodiment is shown in FIG. 4, in which the same portions as in the first embodiment are indicated by the same reference numerals, and detailed explanations of such portions will be omitted.

In the second embodiment, as shown in FIG. 4, the state of operation of the DC servo motor 1 is detected by the potentiometer 3, and a feedback signal is output from the potentiometer 3 directly to the CPU 4.

The following description will be directed to the control operation in the second embodiment with reference to FIGS. 5 and 6.

When the motor actuator 2 approaches the target position, the motor signal which has so far been under DC drive is switched over to PWM drive. At this time the PWM duty ratio is set at 100% (step 61). Checking the potentiovoltage, the potentiometer 3 detects the operating state of the motor 1 (step 62). If the result is within the PWM control range, the PWM control is started and the PWM duty ratio is set at $a_1$% (e.g. 8%) (step 63). At this time, with respect to the feedback signal, if there is no change after the lapse of a certain time (e.g. 0.5 sec.), it is judged that the motor 1 is not in operation (No in step 64), and the PWM duty ratio is raised to $a_2$% (step 66). If here again there is no change in the feedback signal from the motor actuator 2 (No in step 64), the PWM duty ratio is raised to $a_3$% (step 66). This operation (steps 64 and 66) is repeated until the duty ratio becomes 100%, provided when the feedback signal from the motor actuator 2 undergoes a changeover by a certain value or more after the lapse of a certain time (Yes in step 64), the duty ratio is maintained up to the target stop position (step 65). The relation of PWM duty ratio becomes $a_1<a_2<a_3$.

The amount of variation of the PWM duty ratio can be changed freely, for example, 8%, 9%, 11%, 13%, 15%, 20%, 50%, and 100%.

The feedback signal from the motor actuator 2 is subjected to an arithmetic processing in the CPU 4, and the thus-processed signal is output to the driver 5, so that the duty ratio in PWM drive changes successively in response to the state of operation of the motor 1.

According to the second embodiment constructed as above, even in the case where the duty ratio in PWM drive is fixed, for example, at 10% (a small duty ratio leads to improvement of the control accuracy, but the required torque will no longer be obtainable), there is no fear of a desired torque of the motor 1 becoming unobtainable or the motor 1 becoming inoperative due to a variation in the supply voltage in the motor 1 fed from the car battery.

Although in the previous first embodiment 50% was shown as a concrete example of the duty ratio, this value is based on the standpoint that the number of revolutions does not change to the extreme degree and that a satisfactory deceleration effect is obtained. In the present invention, however, no limitation is made to the selected duty ratio, and the duty ratio may be fixed to any other value, e.g. 60% or 40%, in accordance with the response characteristics or the like of the DC servo motor or the actuator.

Further, although in the above embodiments the position detection device is a potentiometer which is simple in structure and capable of making the drive control system low in cost, there is made no limitation to the potentiometer in the present invention. For example, there may be used an optical encoder constituted by a rotary plate having small holes (or slits) formed at predetermined intervals in the circumferential direction.

What is claimed is:

1. A drive control system for a servo motor comprising:

a potentiometer connected to a rotor of the servo motor, the potentiometer generating a rotational position value indicative of a rotational position of the servo motor; and control means for switching a drive mode of the servo motor from DC drive to pulse width modulation (PWM) drive when a difference between said rotational position value and a target stop position value corresponding to a target stop position of the servo motor is less than a predetermined amount, and for transmitting a plurality of pulse width drive signals to the servo motor during said PWM drive, each of the pulse width drive signals having a duty ratio value;

wherein said control means sequentially changes the pulse width drive signal transmitted to the servo motor such that the duty ratio value of the transmitted pulse width drive signals decreases as said difference decreases.

2. A drive control system for a servo motor according to claim 1, wherein:

said control means sequentially changes the pulse width drive signal transmitted to the servo motor such that a duty ratio in PWM drive is incrementally increased from smaller to larger values when the potentiometer fails to detect a change in rotational position of the servo motor over a predetermined interval; and when the potentiometer subsequently detects a change in said rotational position of the servo motor, said control means continuously transmits the pulse width drive signal being transmitted at that time.

* * * * *